(12) United States Patent
Grootwassink et al.

(10) Patent No.: US 9,648,516 B2
(45) Date of Patent: May 9, 2017

(54) METHOD AND SYSTEM FOR DATA FLOW MANAGEMENT OF USER EQUIPMENT IN A TUNNELING PACKET DATA NETWORK

(71) Applicant: Yaana Technologies, LLC., Milpitas, CA (US)

(72) Inventors: David Grootwassink, Safety Harbor, FL (US); Rajesh Puri, Fremont, CA (US); Michael P. Hammer, Reston, VA (US); Ashok P. Magadum, San Jose, CA (US)

(73) Assignee: Yaana Technologies, LLC, Milpitas, CA (US)

( * ) Notice: Subject to any disclaimer, the term of this patent is extended or adjusted under 35 U.S.C. 154(b) by 0 days.

(21) Appl. No.: 14/488,117

(22) Filed: Sep. 16, 2014

(65) Prior Publication Data
US 2015/0245249 A1   Aug. 27, 2015

Related U.S. Application Data

(60) Provisional application No. 61/943,248, filed on Feb. 21, 2014.

(51) Int. Cl.
*H04W 28/12* (2009.01)
*H04L 29/12* (2006.01)
(Continued)

(52) U.S. Cl.
CPC ......... *H04W 28/12* (2013.01); *H04L 12/4633* (2013.01); *H04L 41/00* (2013.01); *H04L 61/6068* (2013.01); *H04L 67/1095* (2013.01); *H04W 76/022* (2013.01); *H04L 61/103* (2013.01); *H04L 61/1588* (2013.01);
(Continued)

(58) Field of Classification Search
CPC ... H04W 28/12; H04W 76/022; H04W 80/04; H04L 61/6068
USPC ....... 370/241, 252, 254, 312, 328, 390, 392, 370/393; 455/519; 709/224
See application file for complete search history.

(56) References Cited

U.S. PATENT DOCUMENTS

| 2004/0213179 A1 | 10/2004 | Lundin et al. |
| 2004/0264405 A1 | 12/2004 | MacGregor Scobbie |

(Continued)

FOREIGN PATENT DOCUMENTS

EP     1993257 A1   11/2008

OTHER PUBLICATIONS

International Search Report issued Jul. 8, 2015 in corresponding PCT Application No. PCT/US2015/016961 filed Feb. 20, 2015, inventor(s) Grootwassink, David, et al.

*Primary Examiner* — Charles C Jiang
*Assistant Examiner* — Wali Butt
(74) *Attorney, Agent, or Firm* — Steptoe & Johnson LLP

(57) ABSTRACT

A data replication system of a communication network is disclosed. According to one embodiment, the data replication system includes a replication gateway node and a replication control system. The replication gateway node is configured to create a first replication tunnel between a first gateway node and the replication gateway node and a second replication tunnel between the replication gateway node and a second gateway node. The replication gateway node replicates data streams between the first gateway node and the second gateway and delivers the replicated data stream to a management node for further analysis.

23 Claims, 10 Drawing Sheets

(51) Int. Cl.

| | | |
|---|---|---|
| *H04W 76/02* | (2009.01) | |
| *H04L 29/08* | (2006.01) | |
| *H04L 12/46* | (2006.01) | |
| *H04L 12/24* | (2006.01) | |
| *H04W 80/04* | (2009.01) | |

(52) U.S. Cl.
CPC ...... *H04L 61/2015* (2013.01); *H04L 61/2084* (2013.01); *H04W 80/04* (2013.01)

(56) References Cited

U.S. PATENT DOCUMENTS

| | | | |
|---|---|---|---|
| 2005/0053068 A1* | 3/2005 | Toth | H04L 12/185 |
| | | | 370/390 |
| 2008/0285452 A1 | 11/2008 | Oran | |
| 2011/0075675 A1 | 3/2011 | Koodli et al. | |
| 2011/0170545 A1* | 7/2011 | Zheng | H04L 12/2856 |
| | | | 370/392 |
| 2011/0191469 A1* | 8/2011 | Oran | H04L 65/80 |
| | | | 709/224 |
| 2013/0128886 A1* | 5/2013 | Shah | H04L 12/185 |
| | | | 370/390 |
| 2013/0301627 A1 | 11/2013 | Chen et al. | |

\* cited by examiner

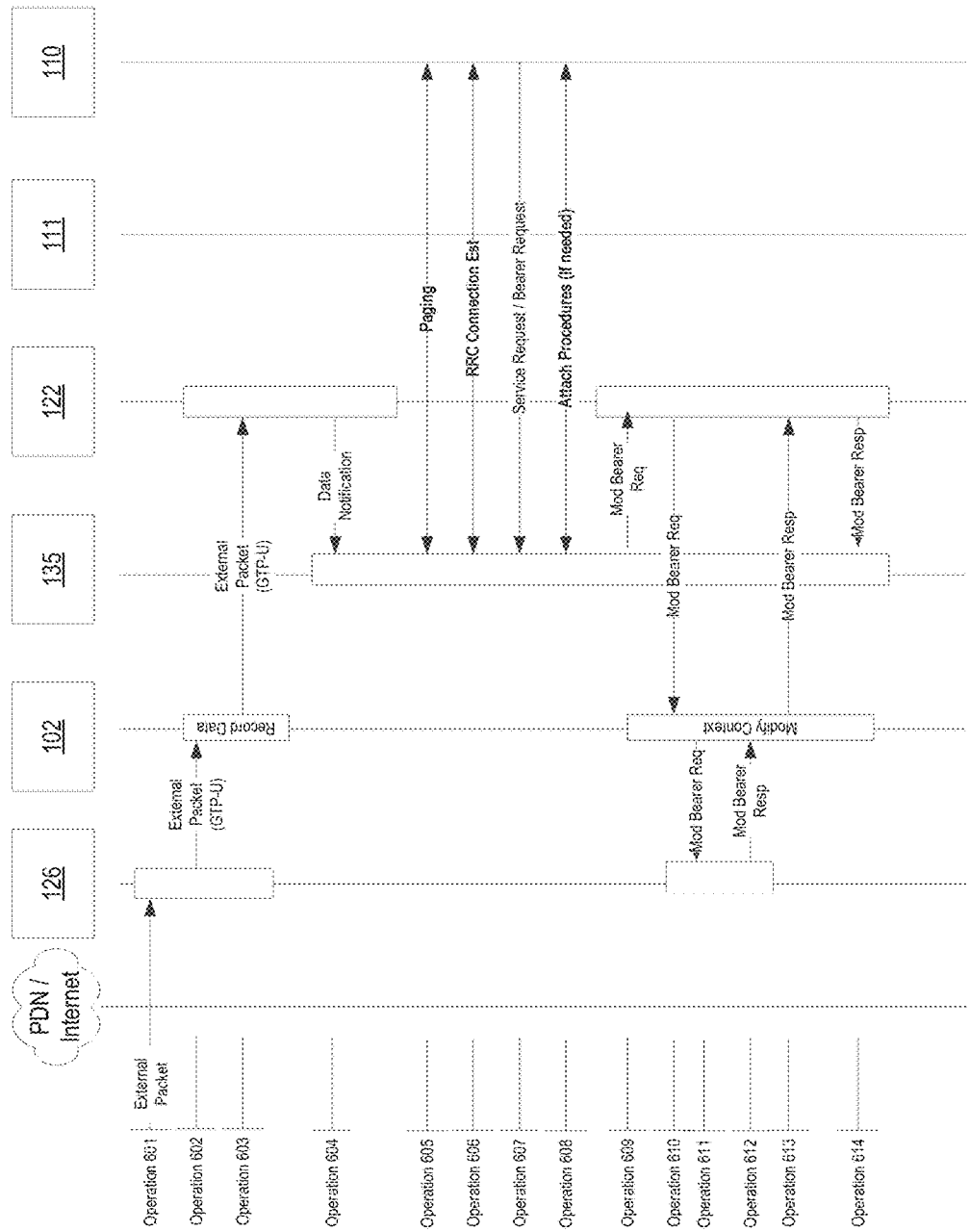

METHOD AND SYSTEM FOR DATA FLOW MANAGEMENT OF USER EQUIPMENT IN A TUNNELING PACKET DATA NETWORK

CROSS-REFERENCE TO RELATED APPLICATIONS

The present application claims priority to U.S. Patent Application No. 61/943,248 filed on Mar. 6, 2014, entitled "Method and system for isolation, Diversion, Replication, and Route Management of Data Flow of User Equipment in a tunneling packet data network," which is herein incorporated by reference.

FIELD

The present disclosure generally relates to network communications and, more particularly, to a method and system for data flow management of user equipment in a tunneling packet data network.

BACKGROUND

Long Term Evolution (LTE) is a standard for wireless communication of high-speed data for mobile phones and data terminals. LTE provides mobile broadband connectivity to user equipment (UE) within the LTE network at higher data rates than previous generation wireless networks. For example, the air interface for LTE, referred to as evolved universal mobile telecommunication system (UMTS) terrestrial radio access network (E-UTRAN), utilizes multi-antenna and multi-user coding techniques to achieve downlink data rates of hundreds of megabits per second (Mbps) and uplink data rates of tens of Mbps.

Tunneling is a mechanism used to encapsulate a foreign payload protocol across an LTE network that normally does not support the foreign payload protocol. A tunneling protocol allows a network system to carry a foreign payload protocol, for example, carrying a General Packet Radio Service (GPRS) Tunneling Protocol (GTP) on User Datagram Protocol (UDP)/Internet Protocol (IP) versus Transmission Control Protocol (TCP)/IP, a Mobile IP (MIP), or Proxy Mobile IP (PMIP). Packets enter a tunnel at one end and exit the tunnel at the other end.

A conventional network system captures data from user equipment (UE) of a subscriber on a tunneled network using a passive probing node. The passive probing node absorbs and decodes, and monitors data links that carry data streams in a service provider network. However, the passive probe solution is costly and operationally difficult to manage in a live network because it requires many probes and links to monitor network traffic passing through the passive probe.

SUMMARY

A data replication system of a communication network is disclosed. According to one embodiment, the data replication system includes a replication gateway node and a replication control system. The replication gateway node is configured to create a first replication tunnel between a first gateway node and the replication gateway node and a second replication tunnel between the replication gateway node and a second gateway node. The replication gateway node replicates data streams between the first gateway node and the second gateway and delivers the replicated data stream to a management node for further analysis.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 6 illustrates an exemplary sequence for a network-initiated bearer request, according to one embodiment;

Figure 1:
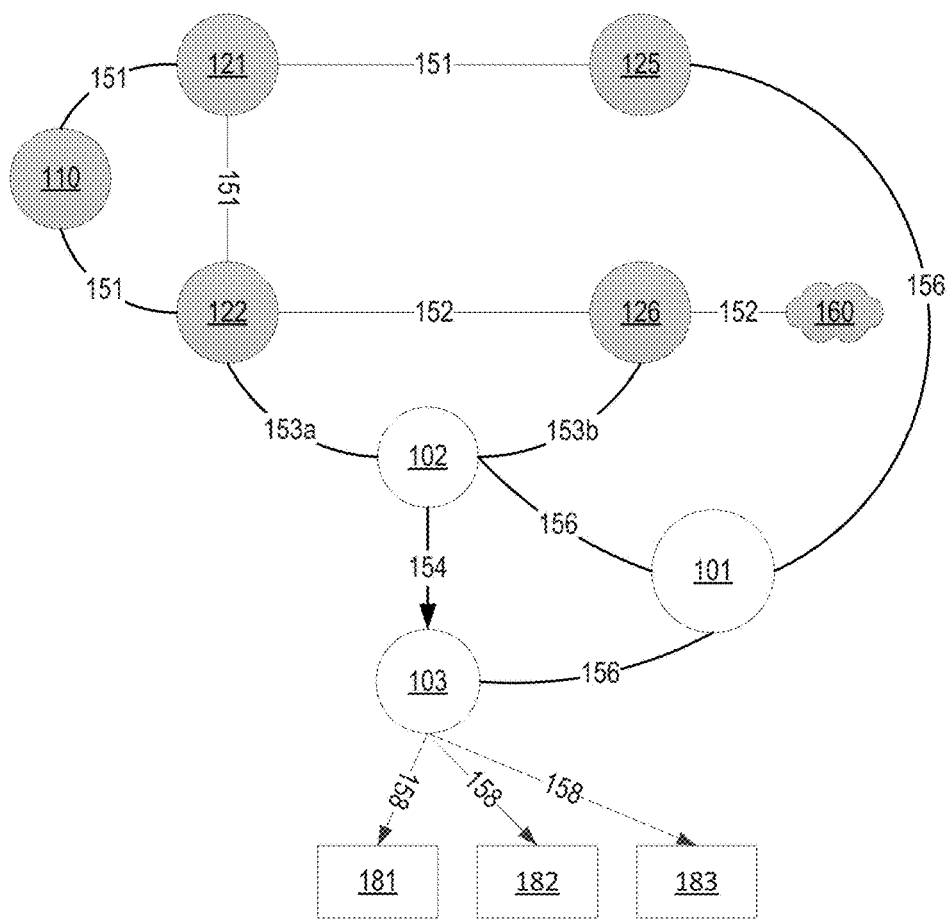
FIG. 1 illustrates communication paths between system entities, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

According to one embodiment, the data replication system includes a replication gateway node and a replication control system. The replication gateway node is configured to create a first replication tunnel between a first gateway node and the replication gateway node and a second replication tunnel between the replication gateway node and a second gateway node. The replication gateway node replicates data streams between the first gateway node and the second gateway and delivers the replicated data stream to a management node for further analysis.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

A data replication system of a communication network is disclosed. According to one embodiment, the data replication system includes a replication gateway node, a replication control system, and a stream normalizer node. The replication control system is configured to create a first replication tunnel between a serving data gateway node and the replication gateway node and a second replication tunnel between the replication gateway node and a packet data network gateway node. The replication gateway node replicates data streams between the serving data gateway node and the packet data network gateway and forwards the replicated data streams to the stream normalizer node.

FIG. 1 illustrates communication paths between system entities, according to one embodiment. User equipment (UE) 110 of a subscriber of a network is connected to a serving control system 121 and a serving data gateway (S-GW) 122 via a standard control plane 151. The S-GW 122 provides user access to the network. The serving control system 121 forwards data streams received from the UE 110 to a home register 125 of a service provider network via the standard control plane 151. A data replication gateway includes the S-GW 122 and a packet data network (PDN) gateway (P-GW) 126. The P-GW 126 provides connectivity to an application services network. The data replication gateway provides data streams received from the UE 110 to a packet data network (PDN) 160 via a UE data path 152. It is noted that the connection between the S-GW 122 and the P-GW 126 may be one-to-one, N-to-one, one-to-N, or N-to-N(N being lager than one) without deviating from the scope of the present disclosure.

According to one embodiment, the present system and method provides isolation, diversion, replication, and route management of data streams that originate from the UE 110 using a replication control system 101, a replication gateway (R-GW) node 102, and a stream normalizer node 103 via a replication control plane 156. The present system replicates data streams using the R-GW 102 via a re-routed UE data path 153 and performs stream separation, analysis, and transformation of replicated data.

Deep Packet Inspection (DPI) is performed by intermediate network nodes to examine the content of a packet at protocol layers above those needed to forward the packet across the network. A packet is pre-pended with a header for each successive lower protocol layer until the final link-layer header and trailer framing are added. A DPI node that processes a packet parses and peels off the headers of a link-layer (e.g., Ethernet), a network-layer (e.g., IP), and a transport-layer (e.g., TCP) and extracts a higher-level application-layer protocol. The DPI node may also peel off a packet header of a tunneling layer such as GTP and Generic Routing Encapsulation (GRE). Application content deep inside the packet, such as Web traffic (e.g., Hypertext Transfer Protocol (HTTP)), voice traffic (e.g., Session Initiation Protocol (SIP) signaling and Real-time Transport Protocol (RTP) media), and other traffic may then be inspected and analyzed.

According to one embodiment, the home register 125 provided by a service provider network includes the replication control system 101. The home register 125 may be a 2G/3G Home Location Register (HLR), a 4G Home Subscriber Server (HSS). It is noted that the home register 125 can cover other types of network protocols and technologies including IP, Worldwide Interoperability for Microwave Access (WiMax) without deviating from the scope of the present disclosure. The replication control system 101 provisions routing information and changes the indicated address of the P-GW 126 for the UE 110 to the address of the R-GW 102. The R-GW 102 is provisioned with the address of the P-GW 126 that provides service to the UE 110. The routing information provisioned in the home register 125 is propagated throughout the network.

Upon receiving a request for data stream activation for the UE 110, the serving control system 121 creates dedicated data tunnels 153a and 153b from the S-GW 122 to the address of the P-GW 126 as indicated for the UE 110. The network address of the R-GW 102 is used for re-routing data streams between the S-GW 122 and the P-GW 126.

The S-GW 122 creates a dedicated session tunnel 153a for the UE 110 to the R-GW 102. The R-GW 102 becomes the tunnel end-point for the S-GW 122. The R-GW 102 further establishes a second tunnel 153b to the address of the previously provisioned P-GW 126. These two tunnels are bonded together within the R-GW 102. In the event when the P-GW 126 establishes a tunnel, the same procedure is undertaken in a reverse direction. Therefore, the present system provides the flexibility of handling both UE-initiated data sessions and network-initiated data sessions. The steps creating two session tunnels among the S-GW 122, the R-GW 102, and the P-GW 126 are repeated for each session. The session creation may be initiated by a data bearer in response to the request of the UE 110, or an application on the network that attempts communication to the UE 110. For example, the GTP control plane (GTP-C) signaling channel packets between 122 and 102 assigns a data bearer Tunnel End-point ID (TEID) to setup a bearer connection. The data bearer channel GTP user plane (GTP-U) packets of the tunnel have the same TEID. The information gathered from the control plane is used to drive the tunnel management of the user plane.

The R-GW 102 receives data stream or related signaling events from the S-GW 122 through a tunnel. Once it is created, a TEID tunnel can be modified, for example, adding a bandwidth, changing in Quality of Service (QoS) characteristics, or released, for example, removing the TEID assignment. The received data stream is mapped and transmitted to the P-GW 126 via the corresponding bonded tunnel. The R-GW 102 replicates the received data streams by tagging the replicated data streams with identification information and forwards the replicated data streams to the stream normalizer node 103 via a replicated UE data path 154. The identification information correlates with mobile station international subscriber directory number (MSISDN), international mobile subscriber identity (IMSI), international mobile station equipment identity (IMEI), and labels provided by the control system.

According to one embodiment, the present system provisions a deletion of a UE channel. In one example, the replication control system 101 notifies the home register 125 and the R-GW 102 that the tunnel 153*a*-153*b* is no longer needed. The R-GW 102 diverts the user to use the normal path 152. In another example, for a provisioned target UE 110, if the S-GW 122 tears down the path 153*a* or if the P-GW 126 tears down the path 153*b*, the replication control system 101 tears down the other path as well and relays, modifies or deletes commands across 102.

When a command is received from a UE tunnel that indicates a deletion of a session, the R-GW 102 sends a modified command across the bonded tunnel. Upon receipt of acknowledgement from the bonded device, the R-GW 102 acknowledges the original command and de-allocates the resource that is assigned to the corresponding tunnels.

The stream normalizer node 103 performs the separation and reassembly of data streams based on stream characteristics provided by the replication control system 101. The normalized data streams by the stream normalizer node 103 are forwarded via a normalized UE data path 158 to an appropriate downstream service (e.g., services 181, 182, and 183), such as a compliance service for legal interception for content or metadata, fraud detection analysis, security analysis and profile, and service usage analytics.

FIG. 2-8 illustrate exemplary tunneling protocols for General Packet Radio Service (GPRS) Tunneling Protocol (GTP) Phase II (or GTP-Cv2) used in an LTE network. It is noted that the present system and method are applicable to other tunneling protocols and other types of networks without deviating from the scope of the present disclosure, and is not limited to the exemplary disclosures associated with FIGS. 2-8. For example, the present system and method can be implemented in a 3G GPRS network, a Mobile IP (MIP) network, Proxy Mobile IP (PMIP) network, or any other Mobile IP network.

In a fashion analogous to GTP and PMIP, a Locator/ID Separation Protocol (LISP) may also be provisioned such that IP traffic is routed through a replication gateway. The LISP describes a network-layer-based protocol that enables separation of IP addresses into two new numbering spaces: Endpoint Identifiers (EIDs) and Routing Locators (RLOCs). Proxy Ingres and Egress Tunnel Routers may be used along with a Dynamic Host Configuration Protocol (DHCP) server to setup a chain of routers through which the IP traffic flows. The replication gateway may be a part of the chain of routers.

An Ingress Tunnel Router (ITR) refers to a router that accepts an IP packet that contains a single IP header with an IP destination address but does not contain a LISP header. The ITR treats this "inner" IP destination address as an Endpoint Identifier (EID) and performs a mapping from the EID to Routing Locators (RLOC). The ITR prepends an "outer" IP header with one of its globally routable RLOCs in the source address field and the result of the mapping lookup in the destination address field. The destination RLOC may be an intermediate proxy device that has better knowledge of the EID-to-RLOC mapping closer to the destination EID. In general, an ITR receives IP packets from site end-systems on one side and sends LISP-encapsulated IP packets toward the Internet on the other side. A LISP mobile node (MN), however, when acting as an ITR LISP, encapsulates all packets that it originates.

An Egress Tunnel Router (ETR) refers to a router that accepts an IP packet where the destination address in the "outer" IP header is one of its own RLOCs. The ETR strips the "outer" header and forwards the packet based on the next IP header found. In general, an ETR receives LISP-encapsulated IP packets from the Internet on one side and sends de-capsulated IP packets to site end-systems on the other side. A LISP mobile node, when acting as an ETR, de-capsulates packets that are typically processed by the mobile node.

A Proxy Ingress Tunnel Router (PITR) is used to provide interconnectivity between sites that use LISP EIDs and those that do not and acts as a gateway between the Legacy Internet and the LISP enabled Network. A PITR advertises one or more highly aggregated EID prefixes into the Internet and acts as the ITR for traffic received from the Internet. A Proxy Egress Tunnel Router (PETR) is an infrastructure element that is used to de-capsulate packets sent from mobile nodes to non-LISP sites.

The LISP-mobile node (LISP-MN) design uses the Map-Server/Map-Resolver service interface in conjunction with a light-weight ITR/ETR implementation in the LISP-MN to provide scalable fast mobility. The LISP-MN control-plane uses a Map-Server as an anchor point that provides control-plane scalability. In addition, the LISP-MN data-plane takes advantage of shortest path routing, and therefore does not increase packet delivery latency.

When a LISP-MN roams onto a new network, the LISP-MN receives a new RLOC. Since the LISP-MN is the authoritative ETR for its EID-prefix, the LISP-MN map-registers the updated RLOC set.

A LISP-MN may be provisioned with an address of a Map-Resolver. A LISP-MN may also learn the address of a Map-Resolver though a dynamic protocol such as DHCP.

According to one embodiment, the RLOC of a mobile node is used as an EID. When a LISP-MN roams into an LISP site, the assigned RLOC may be an address taken from the site's EID-prefix. In this case, the LISP-MN map-registers a mapping from its statically assigned EID to the RLOC that the LISP-MN received from the site. This scenario creates another level of indirection: the mapping from the LISP-MN's EID to a site assigned EID. The mapping from the LISP-MN's EID to the site assigned EID allows the LISP-MN to be reached by sending packets using the mapping for the EID; packets are delivered to site's EIDs use the same LISP infrastructure that all LISP hosts use to reach the site.

A packet egressing a LISP site destined for a LISP-MN that resides in a LISP site has three headers: an inner header that is built by a host and is used by transport connections, a middle header that is built by the site's ITR and is used by the destination's ETR to find the current topological location of the LISP-MN, and an outer header (also built by the site's ITR) that is used to forward packets between the sites.

Figure 8:
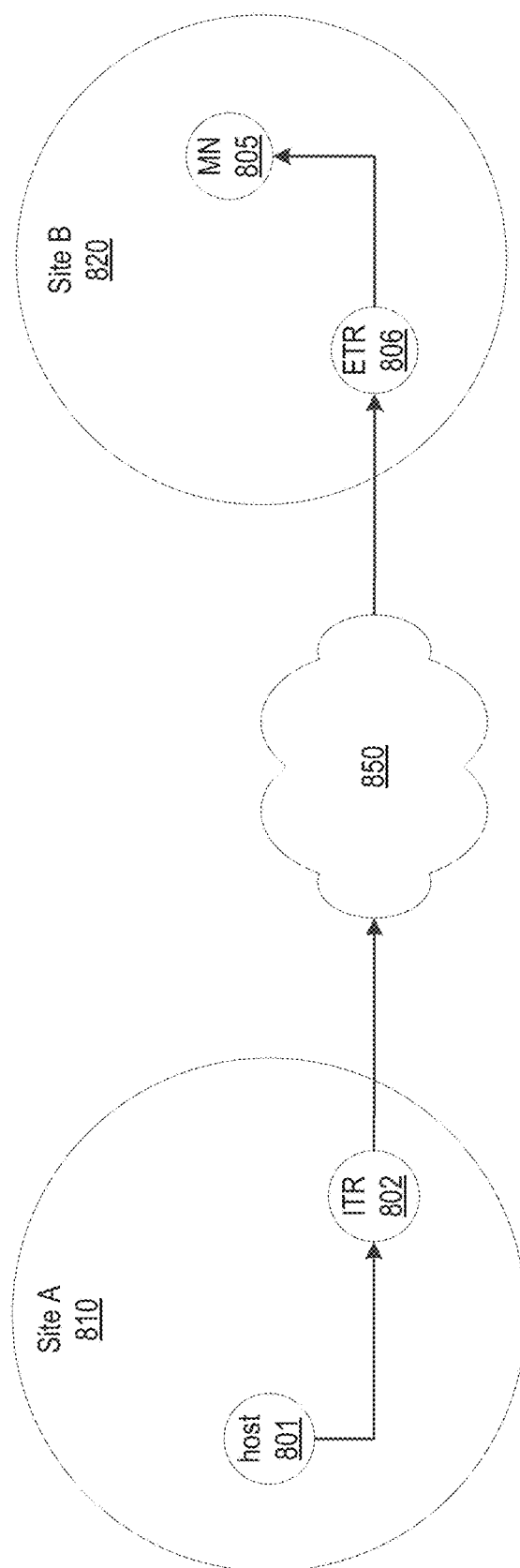
FIG. 8 illustrates a schematic diagram of mobile node roaming into a LISP site, according to one embodiment.

FIG. 8 illustrates a schematic diagram of mobile node roaming into a LISP site, according to one embodiment. A site A 810 has EID-prefix 1.0.0.0/8 and RLOC A and a site B 820 has EID-prefix 2.0.0.0/8 and RLOC B. A host 801 in site A 810 with an EID 1.0.0.1 wants to talk to a LISP mobile node 805 that has registered a mapping from an EID 240.0.0.1 to "RLOC" 2.0.0.2 (where 2.0.0.2 allocated from site B 820's EID prefix, 2.0.0.0/8 in this case). The host 801 sends a packet to ITR 802, and the ITR 802 communicates with the ETR 806 of site B 820 over the Internet 850.

The packet egressing site A 810 and destined for the MN 805 that resides in site B 820 includes an inner header, a middle header, and an outer header. The inner header is used for transport connections. Using the inner header, the EID 1.0.0.1 of the host 801 is mapped to the EID 240.0.0.1 of the MN 805. The middle header is used to find topological location of the MN 805. The MN 805 map-registers the mapping the EID of the MN 805 (240.0.0.1) to RLOC of the MN 805 (2.0.0.2) when it roams into site B 820. The outer header is used to move packets between site A 810 and site B 820.

When a LISP-MN roams into a LISP site and receives a new address (e.g., via DHCP) that is a part of the LISP site's EID space, the following sequence occurs:

1) The LISP-MN in the LISP site (inside MN) registers its new RLOC (a part of the sites EID prefix) to its map-server. Its permanent EID is referred to as "E" and the EID of the new address (DHCP address) is referred to as "D". The LISP-MN registers a mapping E->D.
2) The MN that is outside (outside MN) sends a map request for inside MN's EID (E) and receives D (plus its policy). The outside MN realizes that D is an EID and sends a map request for D. This returns the site's RLOC (by its ETR) that is referred to as
3) The outside MN double encapsulates the outbound packet with the inner destination being D and the outer destination being R.
4) The packet finds its way to R, which strips the outer header and the packet is routed to D in the domain to inside MN. The inside MN de-capsulates the packet to serve the inner header to the application.

Both D and R could be returned to the inside MN in one query, so as not to incur the additional round trip time (RTT).

The mobile node as identified by its permanent EID requests RLOC information from the network to force a routing through a particular router or proxy. Such RLOC information may be used to route the traffic through a replication gateway router.

Figure 2:
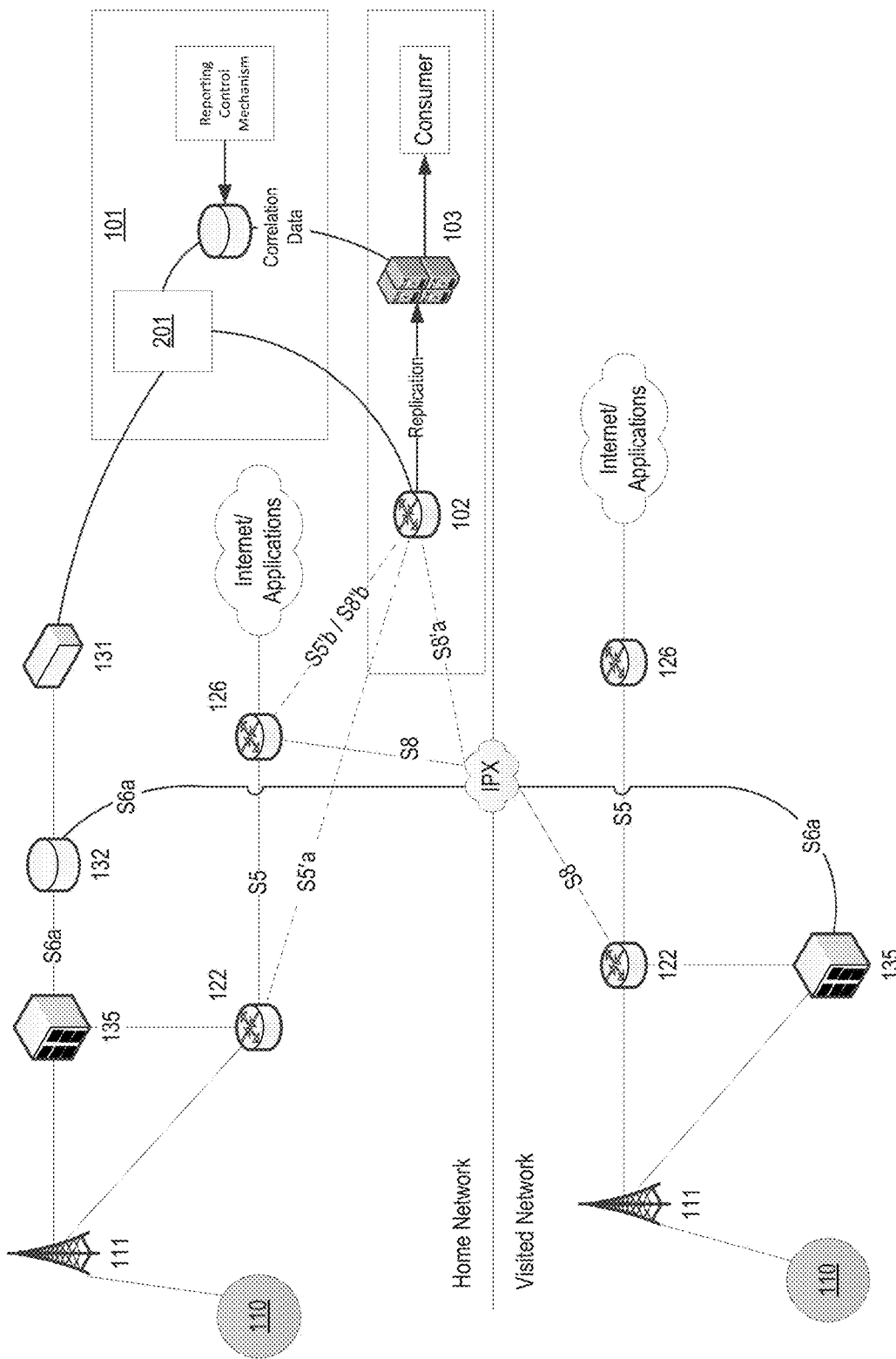
FIG. 2 illustrates an exemplary replication system in an LTE environment, according to one embodiment.

FIG. 2 illustrates an exemplary replication system in an LTE environment, according to one embodiment. A tunneling protocol processor forms an alternate path S5' on the S5 interface and an alternative path S8' on the S8 interface. The replication control system 101 provisions Operations Support System (OSS) 131, Home Subscriber Server (HSS) 132, and Mobility Management Entity (MME) 135 that indicates the S-GW 122 to use the alternate path S5' and/or S8'. The R-GW 102 responds to GTP-C requests to create, modify, and delete a tunnel request. Data packets that are sent from the S-GW 122 to the P-GW 126 through the R-GW 102 that replicates and forwards packets to the stream normalizer node 103 for further analysis.

The eNodeB 111 is a radio base station that connects a radio channel from user equipment 110 to the access the S-GW 122. The MME 135 (corresponding to the serving control system 121 of FIG. 1) is a serving system controller that manages the actions of the eNodeB 111 and S-GW 122. The P-GW 126 provides interworking with an application services network, such as the IP Multimedia Subsystem (IMS) that provides voice services, or the Internet that provides Web and other services. The HSS 132 manages the provisioning data for the UE 111. The OSS 131 is a management system that provides an automated and manual interface for service provider personnel. The HSS 132 and the OSS 131 correspond to the home register 125 of FIG. 1. The S5 and S8 interface corresponds to the path 152. The S5'a and S5'b corresponds to the tunnels 153a and 153b for a home network and S8'a and S8'b corresponds to the tunnels 153a and 153b for roaming data packets from a visited network. Home and Visited networks refer to roaming cases. For example, user equipment on a network (e.g., AT&T) can roam onto or visit a different network (e.g., Verizon). The IPX network is a peering network that enables signaling and bearer data traffic between different mobile networks (e.g., AT&T, Verizon) to interconnect. The reporting control mechanism represents a management system that requests a specific subset of UE's traffic to be alt-routed to perform an analysis on the network traffic. The replication control system 101 has an interface module 201 for interfacing with an operations support system (OSS) 131 for provisioning a target access point name (APN) to intercept a device. The OSS interface module 201 also interfaces with the R-GW 102 for provisioning an intercept device with APN information. A mobility management entity (MME) 135 receives data packets from and to e-UTRAN Node B (eNodeB) 111 and provides the data packets to and from the HSS 132. In some embodiments, the replication control system 101 directly configures the APN without interfacing with the OSS 131.

According to one embodiment, the R-GW 102 is an active gateway and modifies GTP-C and GTP-U messages using two tunnels 153a and 153b at the GTP layer. In this case, the modified GTP-C and GTP-U messages point to the hostname and the IP address of the active R-GW 102. Both the target and non-target traffic arrive at the R-GW 102 from the S-GW 122 via the tunnel 153a. The R-GW 102 redirects the data packets and to the P-GW 126 via the tunnel 153b.

According to another embodiment, the present system and method assigns a P-GW (i.e., secondary P-GW) to serve only target traffic. In this case, messages (e.g., GTP-C and GTP-U messages) are not modified, and a single tunnel between the S-GW and a secondary P-GW is used to redirect target traffic. The S-GW is given the name of the secondary P-GW but associates the IP address of the R-GW with the secondary P-GW. As a result, a HSS targets the R-GW as a front-end to the secondary P-GW at the IP layer. This embodiment utilizes a passive R-GW and is different from the embodiment of the active R-GW in that the tunnel ends at the P-GW, and the passive R-GW does not modify packets beyond the IP addressing. Non-target traffic arrives at the primary P-GW, while the target traffic is redirected through the R-GW and arrives at the secondary P-GW. Redirection of the target traffic from the R-GW to the secondary P-GW is done at the IP layer via an IP re-write. The secondary P-GW handles target traffic while the primary P-GW(s) handle non-target traffic.

According to yet another embodiment, the present system and method has the HSS substitute the IP address of the R-GW for the P-GW single tunnel host target for target traffic. The target traffic pointing to the name of the P-GW with the IP address of the R-GW is redirected by the R-GW at the IP layer via an IP re-write to arrive at the IP address of the P-GW. Non-target traffic querying for the IP address of the P-GW receives the IP address of the P-GW. Both the target traffic and non-target traffic arrive at the P-GW through different routes.

Figure 3:
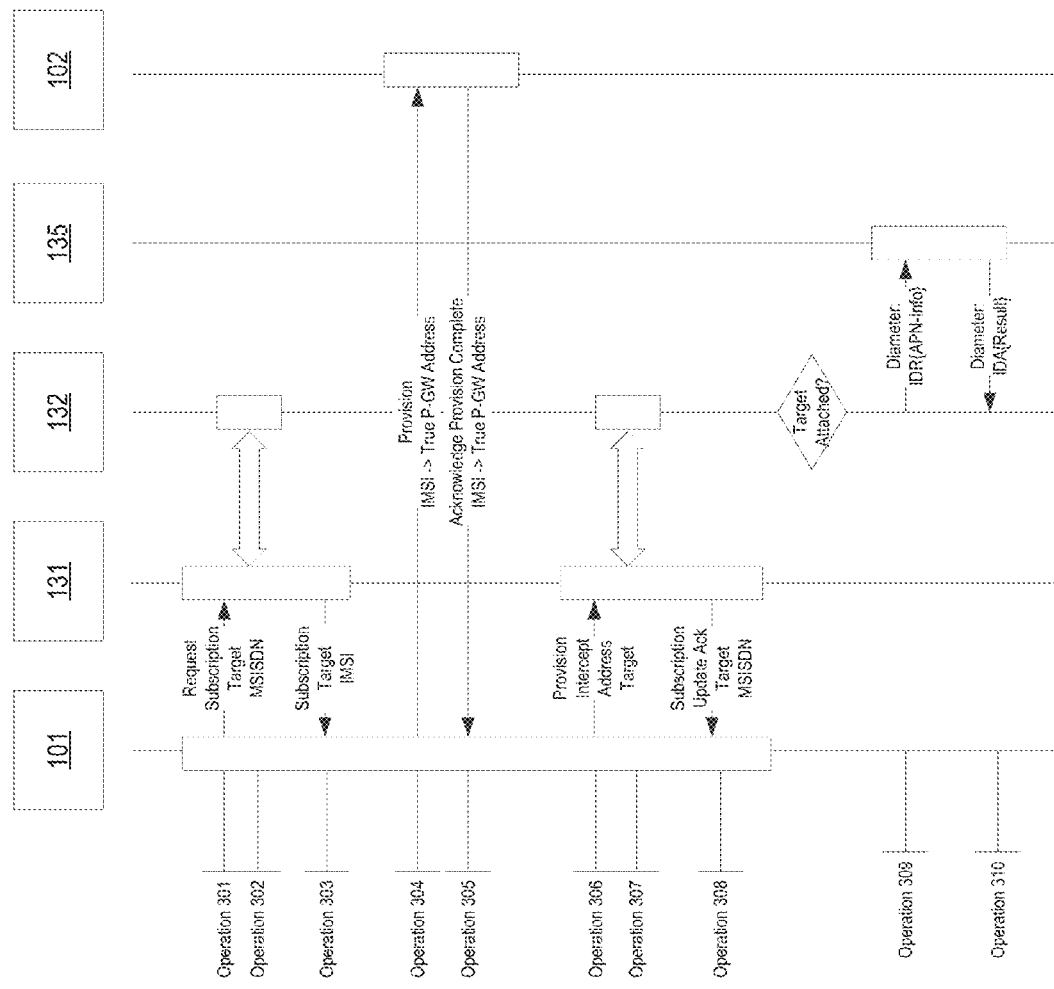
FIG. 3 illustrates an exemplary sequence for provisioning of a replication control system, according to one embodiment.

FIG. 3 illustrates an exemplary sequence for provisioning of a replication control system, according to one embodiment. The replication control system 101 interfaces with the OSS 131 and requests mobile station international subscriber directory number (MSISDN) to make changes to a selected subscriber record in the HSS 132 (Operations 301 and 302). The subscriber record is tied to the IMSI on the SIM card in the UE when the UE is connected to the network. The OSS 131 returns the international mobile subscriber identity (IMSI) and the address of MME 135 that are assigned to the subscriber (Operation 303). The retrieved information from the OSS 131 is stored within a database of the R-GW 102 (Operations 304 and 305). After successful completion of storage in the database of the R-GW 102, the OSS 131 modifies the address of the MME 135 for the target subscriber (e.g., IMSI resident on the UE) to the address of the R-GW 102 (Operations 306, 307, and 308). As the OSS 131 provisions the HSS 132, the OSS 131 determines if the target subscriber is currently attached. If the target subscriber is currently attached, the HSS 132 uses an Authentication, Authorization and Accounting (AAA) protocol such as Diameter protocol (e.g., insert-subscription data request (IDR) and inserts subscription data answer (IDA)) to update the current MME with the address of the R-GW 102 (Operations 309 and 310).

Figure 4A:
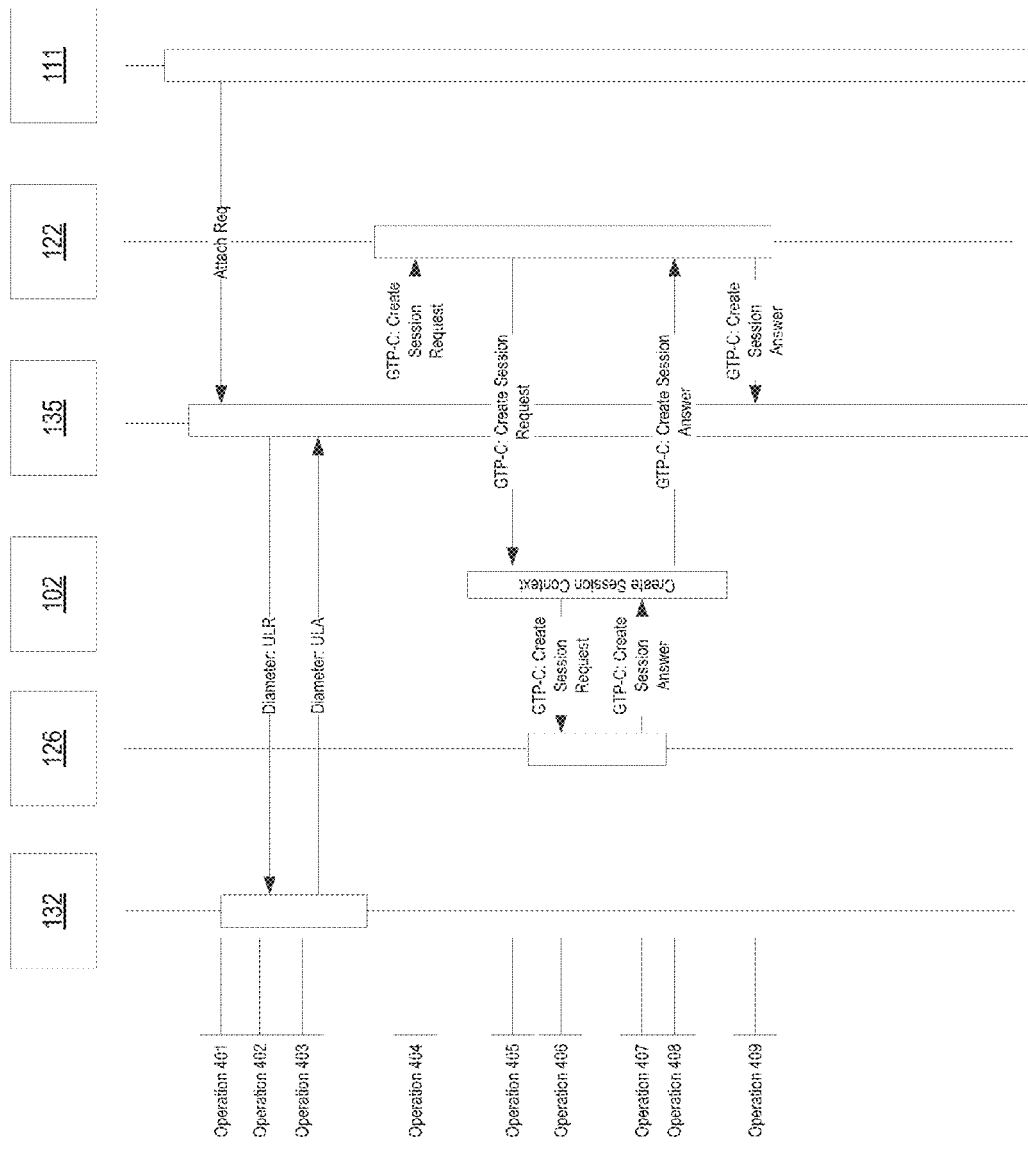
FIGS. 4A and 4B illustrate an exemplary sequence of an attach procedure for an eNodeB, according to one embodiment.
Figure 4B:
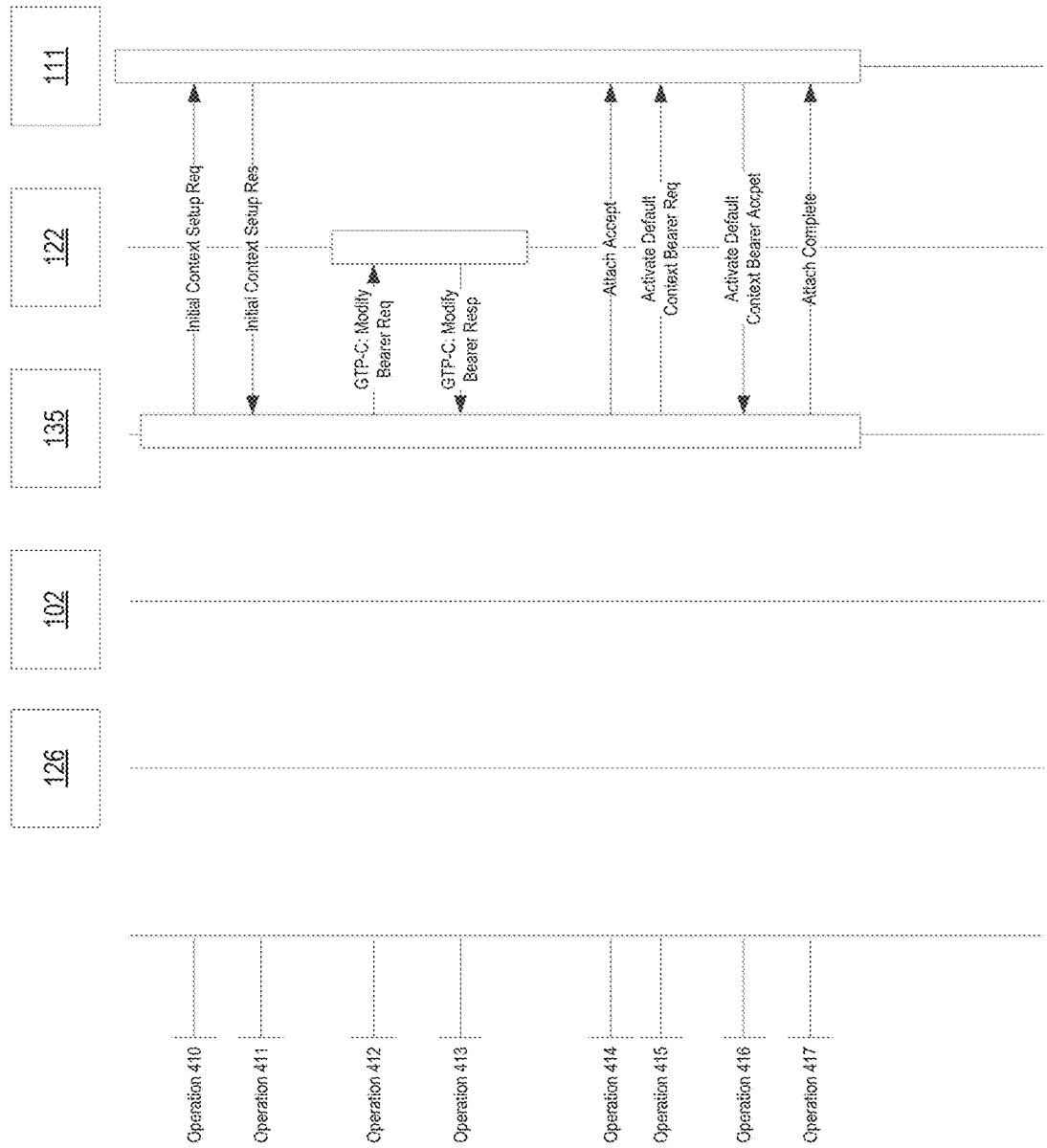

FIGS. 4A and 4B illustrate an exemplary sequence of an attach procedure for an eNodeB, according to one embodiment. eNodeB 111 sends an attach request to the MME 135 (Operation 401). If the MME 135 does not have a profile for a subscriber of eNodeB 111, the MME 135 sends a message for an update location request (ULR) to the HSS 132 (Operation 402). If the subscriber is allowed to receive a service from the MME 135, the HSS 132 replies to the MME 135 with the subscriber's profile information in a Diameter message for an update location answer (ULA) including the address of the R-GW 102 as the P-GW address for the APN (Operation 403). The serving MME 135 creates a new GTP session request (CreateSession) for the subscriber and routes the attach request through the S-GW 122 toward the R-GW 102. (Operations 404 and 405)

Upon receipt of the CreateSession command from the S-GW 122, the R-GW 102 creates session context on both sides of the system (Operation 406) by:
1) generating a unique tunnel end-point identifier (TEID) for communication between the R-GW 102 and the P-GW 126;
2) generating a termination point for the TEID generated by the S-GW 122 directed toward the R-GW 102;
3) creating a mapping between the TEID received from the S-GW 122 and the newly generated TEID between the R-GW 102 and P-GW 126;
4) extracting the relevant GTP-C packets and forwarding it to an off-line processing system; and
5) generating a new GTP-C command directed at the actual P-GW 126 containing the information received by the R-GW 102 from the S-GW 122.

The P-GW 126 receives the CreateSession command from the R-GW 102 and performs operations as if the CreateSession command came from the S-GW 122. The P-GW 126 sends the CreateSession answer to the R-GW 102 as if the CreateSession answer is received from the S-GW 122 (Operation 407). The R-GW 102 receives the CreateSession answer from the P-GW 126 and using the internal mapping, creates a similar CreateSession answer message directed back to the S-GW 122 (Operation 408) and to the MME 135 (Operation 409) to complete the sequence. The MME 135 sends the Initial Context Setup Request to the eNodeB 111 to assign radio resources for the bearer and receives the available radio resource result via the Initial Context Setup Response (Operation 410-411). The MME 135 then sends a GTP-C Modify Bearer Request to the SGW 122 to match the available resources and receives a Response as acknowledgment (Operation 412-413). The MME then sends Attach Accept (continuation from Operation 401) and Activate Default Context Bearer Request to activate the bearer in the eNodeB and receives the Activate Default Context Bearer Accept in response (Operations 414-416). The MME then sends an Attach Complete to the eNodeB to complete the 3-way handshake (Operation 417).

Figure 5A:
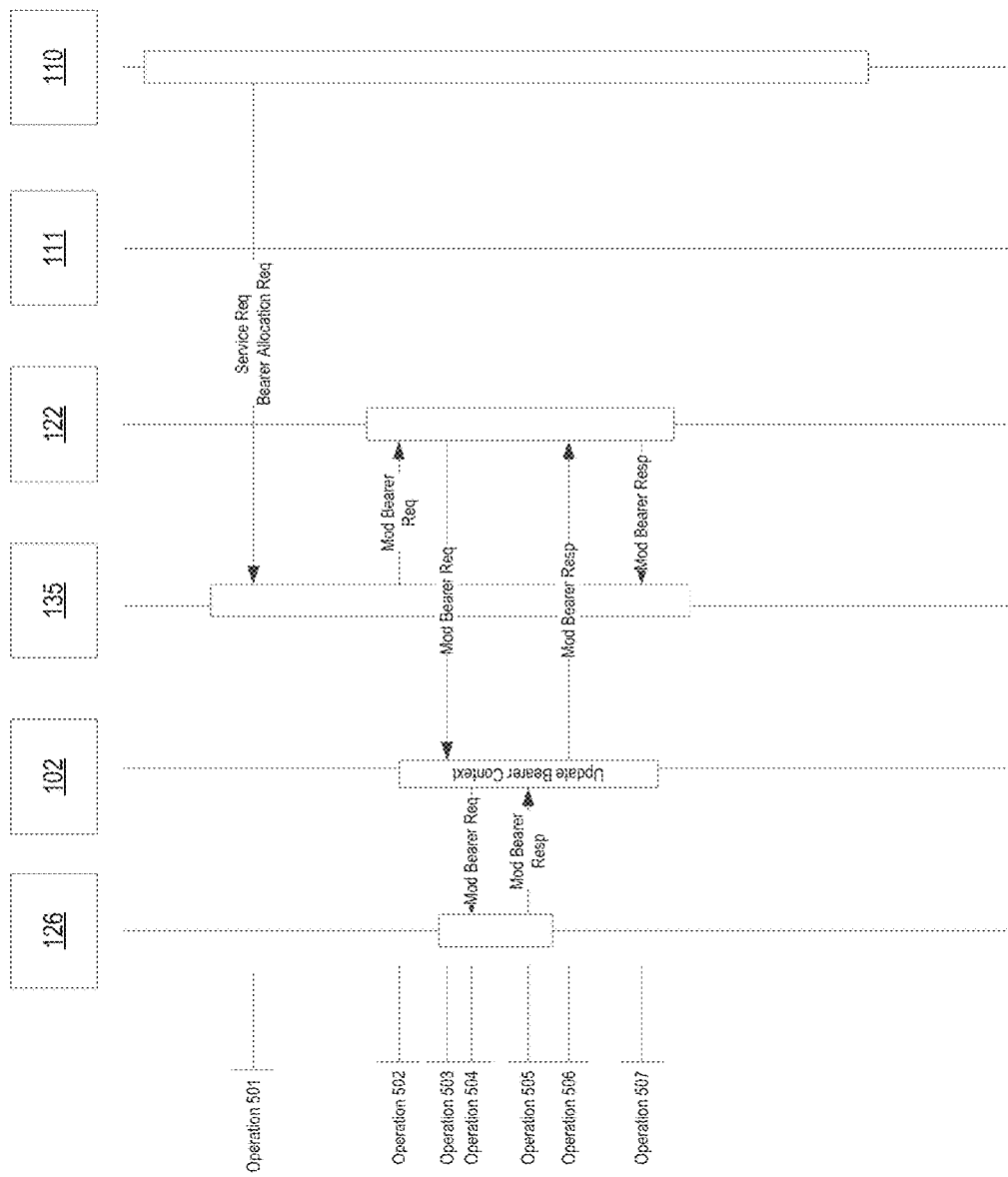
FIGS. 5A and 5B illustrate an exemplary sequence of events for a user-initiated request, according to one embodiment.
Figure 5B:
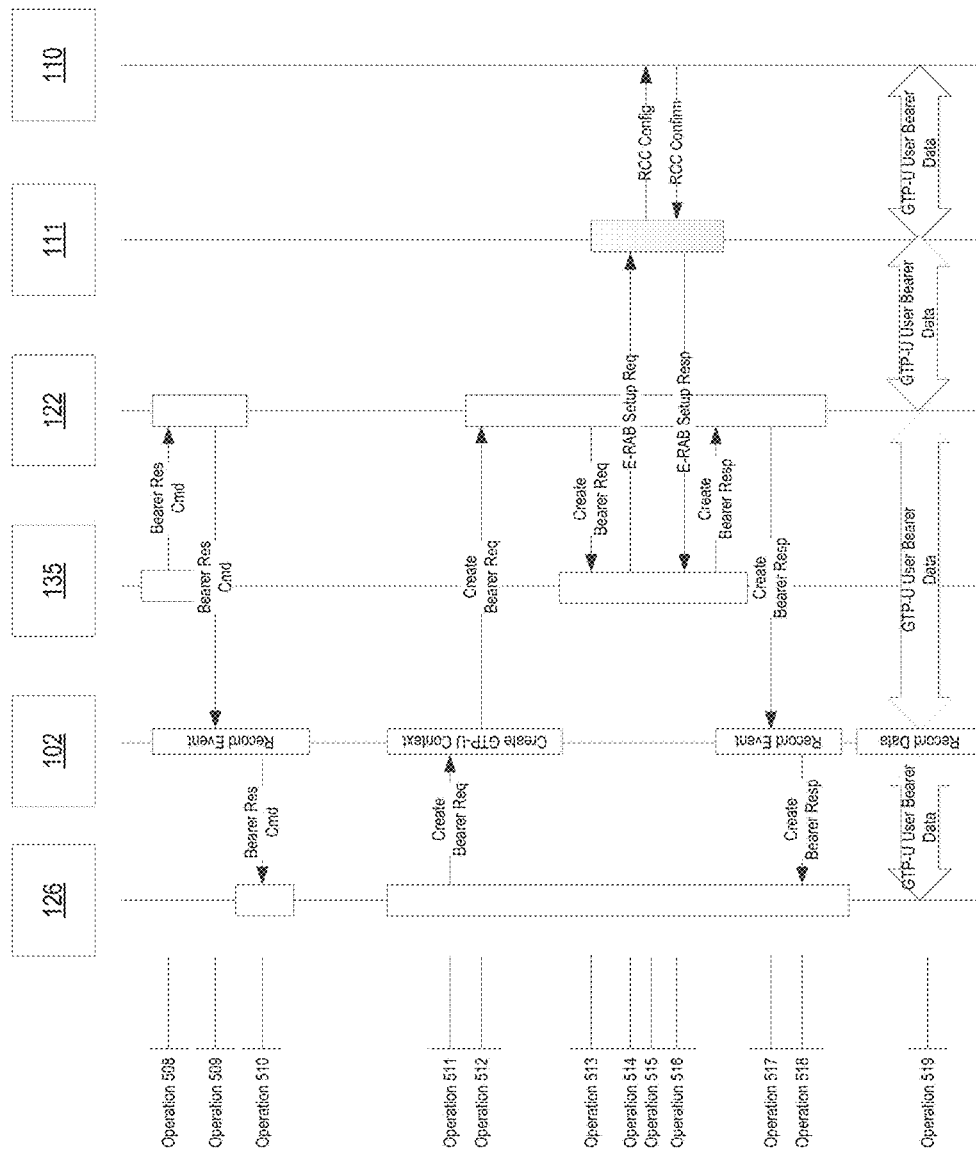

FIGS. 5A and 5B illustrate an exemplary sequence of events for a user-initiated request, according to one embodiment. When the UE 110 of a mobile subscriber requests a wireless data service, a sequence of standard LTE procedures is initiated to request a bearer path for transmitting and receiving data packets. According to one embodiment, the UE 110 sends a service request and a bearer allocation request to the MME 135 (Operation 501). In response, the MME 135 sends a modify bearer request to the S-GW 122 (Operation 502). The S-GW 122 sends the modify bearer request toward the R-GW 102, and the R-GW 102 acts as the P-GW 126 of the UE 110 (Operation 503).

The R-GW 102 records bearer request information from the modify bearer request, makes changes to the bearer request information, and invokes a similar message to the bearer request message toward the P-GW 126 for the subscriber (Operation 504). The P-GW 126 prepares to support a new bearer for the UE 110 and invokes a modify bearer response to the R-GW 102 (Operation 505). The R-GW 102 records the bearer response information from the modify bearer response and invokes a similar message toward the S-GW 122 (Operation 506). The forwarded message may have the same message type as the modify bearer response message but have a different parameter (e.g., TEID value). The S-GW 122 forwards the message to the MME 135 to inform that the P-GW 126 is prepared to create a data bearer path (Operation 507).

The MME 135 creates the data bearer path to send a bearer resource command to the serving S-GW 122 (Operation 508). The S-GW 122 forwards the bearer resource command to the R-GW 102 as the stand-in P-GW 126 (Operation 509). The R-GW 102 records the information from the bearer resource command and invokes a similar bearer resource command toward the P-GW 126 for the subscriber (Operation 510). The forwarded message may have the same message type as the bearer resource command message but have a different parameter (e.g., TEDI value).

After receiving the message, the P-GW 126 allocates a resource and creates a new bearer data path. In one embodiment, the P-GW 126 creates a new data bearer. As a part of the process, the P-GW 126 invokes a create bearer request toward the R-GW 102 as the stand-in S-GW 122 (Operation 511).

After receiving the create bearer request, the R-GW 102 creates new data bearer context sets for both sides of the GTP-U plane in anticipation of a new user data bearer path. The R-GW 102 invokes a similar create bearer request toward the S-GW 122 for the subscriber (Operation 512). The serving LTE network completes the operation of allocating a data channel and radio resources to the subscriber using standard LTE procedures (Operations 513-516). The S-GW 122 requests the MME 135 to setup a bearer toward the UE 110 via the Create Bearer Request/Response messages (Operations 513 and 516). The MME 135 in turn requests the eNodeB 111 to setup radio bearers via the E-RAB Setup Request/Response messages (Operations 514-515). The eNodeB 111 uses RCC Config/Confirm to coordinate radio resources with the UE 110.

At the completion of the resource allocations by the serving LTE network, the S-GW 122 sends a create bearer response toward the R-GW 102 to indicate that the serving LTE network is ready to carry data for the subscriber (Operation 517). The R-GW 102 records the information from the create bearer response and invokes a similar create bearer response toward the P-GW 126 for the subscriber (Operation 518).

Once the data bearer path is created, the subscriber data packets flow from the LTE network to the S-GW 122. The S-GW 122 forwards the subscriber data packets to the R-GW 102 on the user plane where the packets are recorded and forwarded to the P-GW 126 (Operation 519).

FIG. 6 illustrates an exemplary sequence for a network-initiated bearer request, according to one embodiment. The network-initiated bearer request is initiated when an external data packet arrives for a mobile subscriber that is not attached to the network. An external data packet arrives at the P-GW 126 of a subscriber from the Internet or another outside packet data network (Operation 601). The P-GW 126 forwards the data packet to the R-GW 102 because the R-GW 102 is the S-GW of record for the P-GW (Operation 602). The R-GW 102 records and forwards the data packet to the last known S-GW 122 of the subscriber (Operation 603). The S-GW 122 informs the serving MME 135 that the external data packet is ready to be delivered to the UE 110 using a data notification message (Operation 604). The serving LTE network attempts to contact the subscriber utilizing standard LTE techniques. It involves finding the UE with paging operations, assigning signaling channels and bearer radio channels to carry user data. (Operations 605-608).

Once network contact is established and resources are allocated to the subscriber, the serving infrastructure initiates standard LTE procedures to request a new data bearer path for transmitting and receiving data packets. The MME 135 sends a modify bearer request to the S-GW 122 (Operation 609). A series of procedures to establish a new data bearer path continues as explained in Operations 603-607 of FIG. 5A (Operations 610-614). Once the data bearer path is created, the data packets flows from the radio network to the S-GW 122. The S-GW 122 forwards the data packets to the R-GW 102 where the packets are recorded and forwarded to the P-GW 126.

Figure 7:
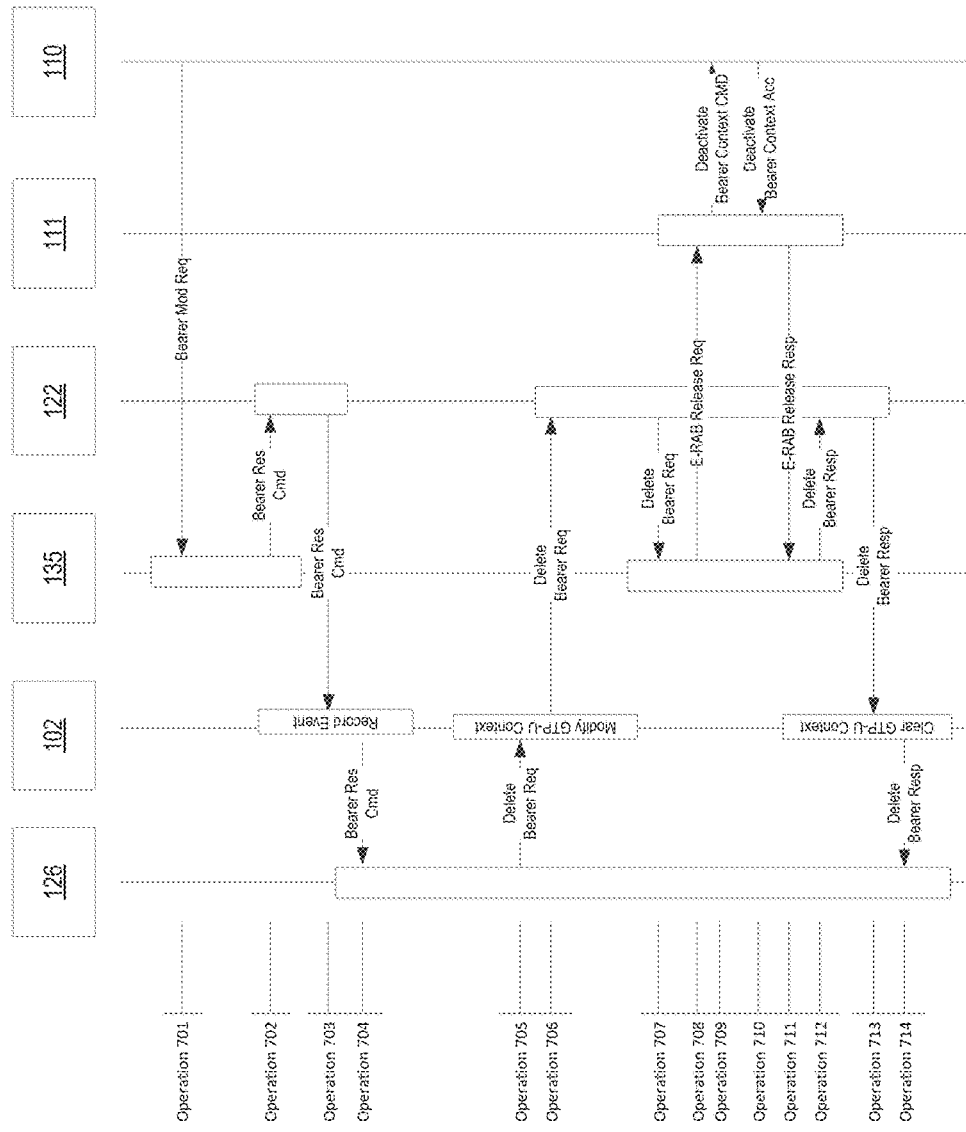
FIG. 7 illustrates an exemplary sequence for a bearer delete request, according to one embodiment.

FIG. 7 illustrates an exemplary sequence for a bearer delete request, according to one embodiment. The bearer delete request is followed when the serving network determines that a data bearer is no longer needed. For example, the serving network determines to delete a data bearer when an existing data bearer is no longer in use or an explicit request is received from the subscriber user equipment (UE) to terminate the data bearer.

The UE 110 sends a bearer modify request to delete a data bearer from the serving MME 135 (Operation 701). In response, the MME 135 issues a bearer resource command to the serving S-GW 122. The serving S-GW 122 prepares to release the resource allocated to the bearer channel and forwards the message to the R-GW 102 (Operations 702 and 703).

The R-GW 102 records the information from the bearer resource command and invokes a similar bearer resource command toward the P-GW 126 for the subscriber (Operation 704). After receiving the bearer resource command, the P-GW 126 starts the process to delete the bearer data path. As a part of the deletion process, the P-GW 126 invokes a delete bearer request toward the R-GW 102 as the stand-in S-GW (Operation 705).

The R-GW 102 records the information from the delete bearer request and modifies the user plane context for the bearer. The R-GW 102 invokes a similar delete bearer request toward the S-GW 122 for the subscriber (Operation 706). The serving LTE network completes the deletion of the data channel and de-allocates radio resources from the subscriber using standard LTE procedures. The S-GW 122 requests the MME 135 to delete a bearer toward the UE 110 via the Delete Bearer Request/Response messages (Operations 707 and 712). The MME 135 in turn requests the eNodeB 111 to release radio bearers via the E-RAB Release Request/Response messages (Operations 708 and 711). The eNodeB 111 uses Deactivate Bearer Context CMD/Acc to release radio resources with the UE 110. (Operations 709-710).

At the completion of the resource de-allocation by the serving LTE network, the serving S-GW 122 sends a delete bearer response toward the R-GW 102 to indicate that the serving LTE network has deleted the resources allocated for the subscriber (Operation 713). The R-GW 102 records the information from the delete bearer response and clears the user plane context resource for the bearer. The R-GW 102 invokes a similar delete bearer response toward the P-GW 126 for the subscriber (Operation 714). When the data tunnel is deleted, the R-GW 102 frees resources that are assigned to the session.

According to one embodiment, the present method of isolating a single subscriber data flow is characterized by the following features.

- The address of an R-GW 102 is provisioned at the HSS 132 as a stand-in packet data network (PDN) gateway (P-GW) address.
- The address of the network gateway (P-GW) is provisioned in the R-GW 102 for route management purposes.
- The R-GW 102 establishes a unique tunnel between a serving data gateway and a packet data network gateway.
- All control plane commands received on one side of the R-GW 102 are evaluated, recorded, and a similar command plane command is constructed and issued from the other side of the R-GW 102.
- All user plane data units received by the R-GW 102 are repeated to the appropriate receiving party. Upstream packets to the P-GW, downstream packets to the S-GW.
- stream normalizer receives replicated control plane and user plane packets and distributes to downstream management nodes for analysis.
- replication control system manages the provisioning of the HSS, the R-GW 102, and the stream normalizer.
- All commands issued over the user plane are interpreted and answered by the R-GW 102 without being transmitted to other parties.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry.

The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

What is claimed is:

1. A data replication system comprising:
   a replication control system;
   a replication gateway node configured to create a first replication tunnel between a first gateway node and the replication gateway node and a second replication tunnel between the replication gateway node and a second gateway node,
   a normal data path between the first gateway node and the second gateway node;
   a secondary data path between the first gateway node and the second gateway node, the secondary data path including the first replication tunnel and the second replication tunnel;
   wherein the replication gateway node redirects a data stream from the normal data path to the secondary data path;
   a stream normalizer node connected to the replication gateway node, wherein the replication gateway node forwards the data stream to the stream normalizer node; and
   wherein the stream normalizer node performs isolation, diversion, separation and reassembly of the data streams, and forwards the data stream to a downstream service.

2. The data replication system of claim 1, wherein the first gateway is a serving data gateway providing user access to the network and the second gateway is a packet data network gateway providing connectivity to an application service network.

3. The data replication system of claim 2, wherein the replication control system changes a name and an address of the packet data network gateway node contained in the data stream to a name and an address of the replication gateway node.

4. The data replication system of claim 1 further comprising a serving control system, wherein the serving control system creates the first replication tunnel in response to a request from user equipment (UE) and the replication gateway node sets up the second replication tunnel.

5. The data replication system of claim 4, wherein the serving control system creates the second replication tunnel in response to a request from an application on the communication network and the replication gateway node sets up the first replication tunnel.

6. The data replication system of claim 1, wherein the replication gateway node bonds the first replication tunnel and the second replication tunnel.

7. The data replication system of claim 1, wherein the replication gateway node deletes both the first replication tunnel and the second replication tunnel in response to a request to delete either the first replication tunnel or the second replication tunnel.

8. The data replication system of claim 1, wherein the downstream service is selected from a group comprising a compliance service, fraud detection analysis, security analysis and profile, and service usage analytics.

9. The data replication system of claim 1, wherein the data replication system is implemented in a service provider selected from a group a long term evolution (LTE) network, a 3G general packet radio service (GPRS) network, a mobile IP (MIP) network, and a proxy mobile IP network (PMIP) network.

10. The data replication system of claim 1, wherein the replication control system comprises an interface module for interfacing with an operations support system for provisioning a target access point name (APN).

11. The data replication system of claim 1, wherein the replication control system directly configures an APN.

12. The data replication system of claim 1, wherein information gathered from a control plane is used to manage a user plane.

13. A method, comprising:
   creating a first replication tunnel between a serving data gateway node and a replication gateway node;
   creating a second replication tunnel between the replication gateway node and a packet data network gateway node;
   redirecting a data stream from a normal data path between the serving data gateway node and the packet data network gateway node to a secondary data path, the secondary data path including the first replication tunnel and the second replication tunnel;
   forwarding the replicated data streams to a stream normalizer node; and
   performing isolation, diversion, separation and reassembly of the data stream, and forwarding the data stream to a downstream service.

14. The method of claim 13 further comprising changing a name and an address of the packet data network gateway node contained in the data stream to a name and an address of the replication gateway node.

15. The method of claim 13 further comprising creating the first replication tunnel in response to a request from user equipment (UE) and causing the replication gateway node to setup the second replication tunnel.

16. The method of claim 15 further comprising creating the second replication tunnel in response to a request from an application on the communication network and causing the replication gateway node to setup the first replication tunnel.

17. The method of claim 13 further comprising bonding the first replication tunnel and the second replication tunnel.

18. The method of claim 13 further comprising deleting both the first replication tunnel and the second replication tunnel in response to a request to delete either the first replication tunnel or the second replication tunnel.

19. The method of claim 13, wherein the downstream service is selected from a group comprising a compliance service, fraud detection analysis, security analysis and profile, and service usage analytics.

20. The method of claim 13, wherein the communication network is selected from a group comprising a LTE network a 3G GPRS network, an MIP network, and a PMIP network.

21. The method of claim 13 further comprising providing an interface module for interfacing with an operations support system for provisioning a target access point name (APN).

22. The method of claim 13 further comprising directly configuring an APN by a replication control system.

23. A method, comprising:
   replacing an IP address of a packet data network gateway node with an IP address of a passive replication gateway;

receiving a target traffic from a serving data gateway at the passive replication gateway node, the target traffic destined for the packet data network gateway node via a normal data path;

replicating a data stream for the target traffic at the passive replication gateway node; and redirecting the target traffic to the packet data network gateway via a secondary data path, wherein the packet data network gateway targets only the target traffic;

forwarding the replicated data streams to a stream normalizer node; and performing isolation, diversion, separation and reassembly of the data stream, and forwarding the data stream to a downstream service.

* * * * *